June 17, 1969
D. N. STEVENS
3,449,966
WINDSCREEN WIPER DRIVE MECHANISMS
Filed Dec. 22, 1967
Sheet 1 of 4
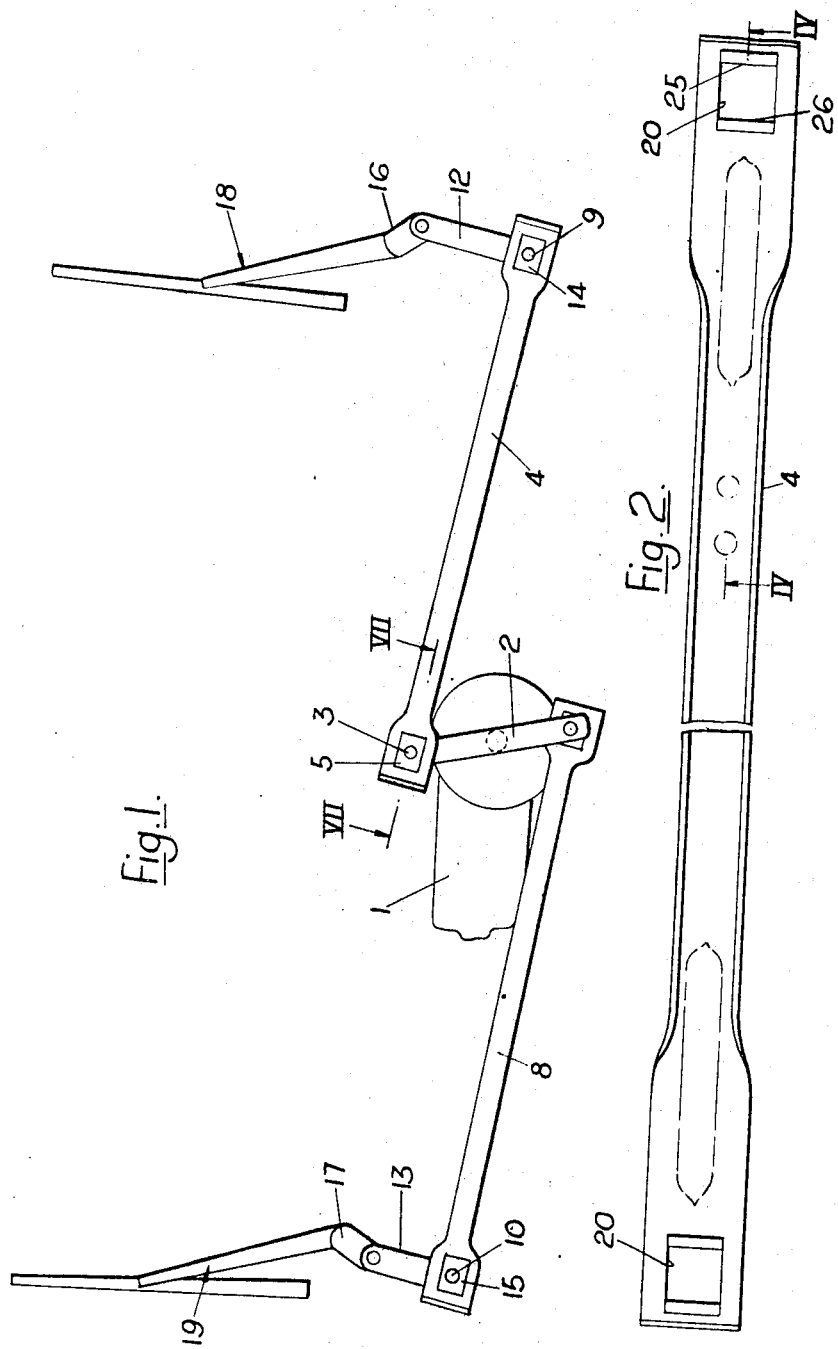
Inventor
Derek Norman Stevens
BY
E. W. Christen
Attorney

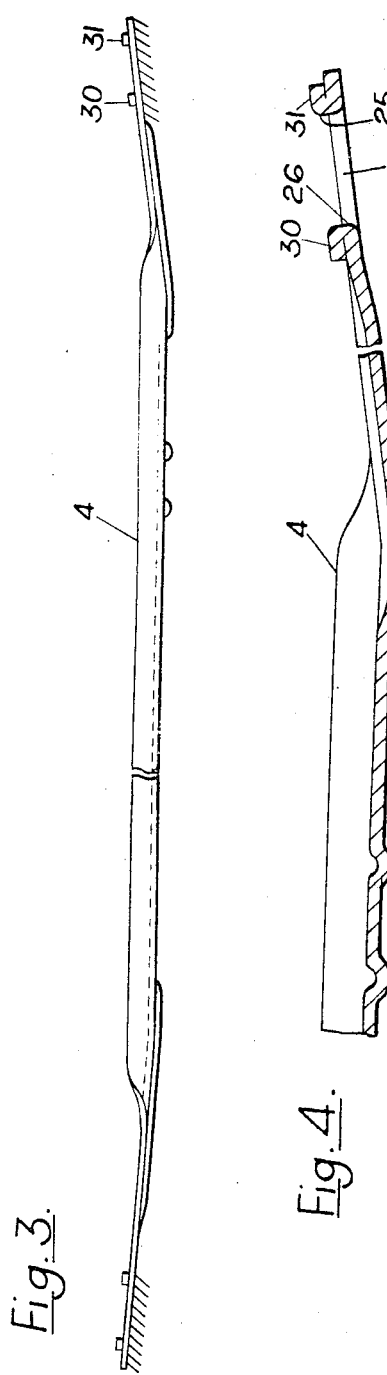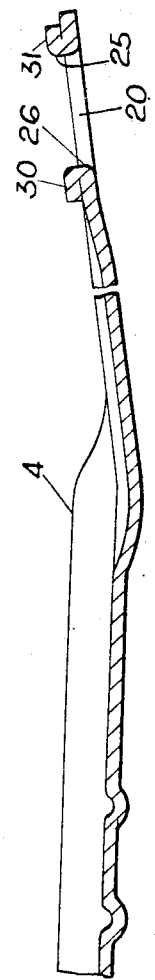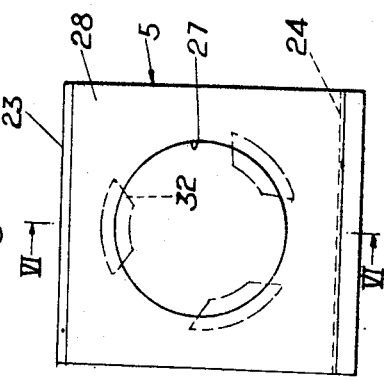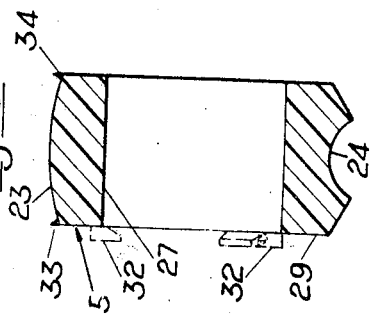

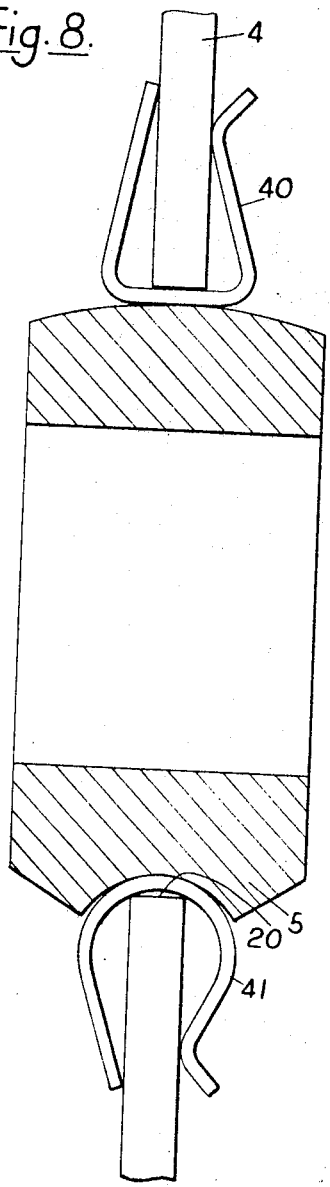

United States Patent Office 3,449,966
Patented June 17, 1969

3,449,966
WINDSCREEN WIPER DRIVE MECHANISMS
Derek Norman Stevens, Dunstable, England, assignor to General Motors Corporation, Detroit, Mich., a corporation of Delaware
Filed Dec. 22, 1967, Ser. No. 692,918
Claims priority, application Great Britain, Jan. 11, 1967, 1,412/67
Int. Cl. F16h 21/02, 21/40; F16c 9/06
U.S. Cl. 74—44                                    9 Claims

ABSTRACT OF THE DISCLOSURE

Each end of a link between a windscreen wiper motor crank and the crank on the wiper arm pivot shaft carries a bush formed as a rectangular prism two opposite faces of which are respectively convex and concave and form parts of the surfaces of the larger and smaller of two concentric cylinders of different radii; the bush has a bore to receive a crankpin and in use the bush can pivot on the edge of a rectangular opening in the link engaged by the concave surface to permit relative movement between the link and the cranks, thus enabling the cranks to be out of parallel with each other.

---

This invention relates to windscreen wiper drive mechanism, and in particular to a drive mechanism by which the drive from a rotary crank of an electric or other motor is transmitted to a reciprocatory crank secured on a shaft on which a windscreen wiper arm and blade assembly is mounted.

In a known windscreen wiper drive mechanism the drive from a crank rotated by a windscreen wiper motor is transmitted to a reciprocatory crank on a wiper arm pivot shaft by means of a connecting rod or link the opposite ends of which are connected to pins on the two cranks, a plain bush which forms a bearing being interposed between each end of the link and its associated crank pin. Such bearings do not permit angular movement of the link if the axes of the crank pins are out of parallel with each other and in the case of such misalignment rapid wear of the bearing bushes takes place with consequent noise and reduced efficiency of transmission.

In a windscreen wiper drive mechanism according to the invention each end of a link which interconnects a rotary and an oscillatory crank is pivotally connected to a crank pin of its associated crank by a bearing bush formed as a rectangular prism two opposite faces of which are respectively of convex and concave curvature and form parts of the surfaces of the larger and the smaller of two concentric cylinders of different radii, said opposite faces being respectively engaged by opposite longitudinally spaced edges of a rectangular recess in the end of the link into which the bush fits, and the crank pin fitting in a bore which extends through a second pair of opposite faces of said bush in a direction at right angles to the common axis of the first said opposite faces.

The face of the prism adjacent one end of the bore abuts the crank arm and a retainer which is received within a recess in the other end of the crank pin and engages the opposite face of the prism to prevent relative axial movement between the bush and crank pin.

The scope of the invention is defined by the appended claims; and the invention and the method by which it is to be performed are hereinafter particularly described with reference to the accompanying drawings, in which:

FIGURE 1 is a diagrammatic elevation of a windscreen wiper system incorporating a windscreen wiper drive mechanism according to the invention;

FIGURE 2 is a plan of a link in the windscreen wiper drive mechanism of FIGURE 1;

FIGURE 3 is an elevation of FIGURE 2;

FIGURE 4 is a section on the line IV—IV in FIGURE 2, to an enlarged scale;

FIGURE 5 is an elevation of a bearing bush forming part of the drive mechanism shown in FIGURE 1;

FIGURE 6 is a section on the line VI—VI of FIGURE 5;

FIGURE 8 is a section showing a modification of the connection between the bearing bush and link shown in FIGURE 7.

Figure 7:
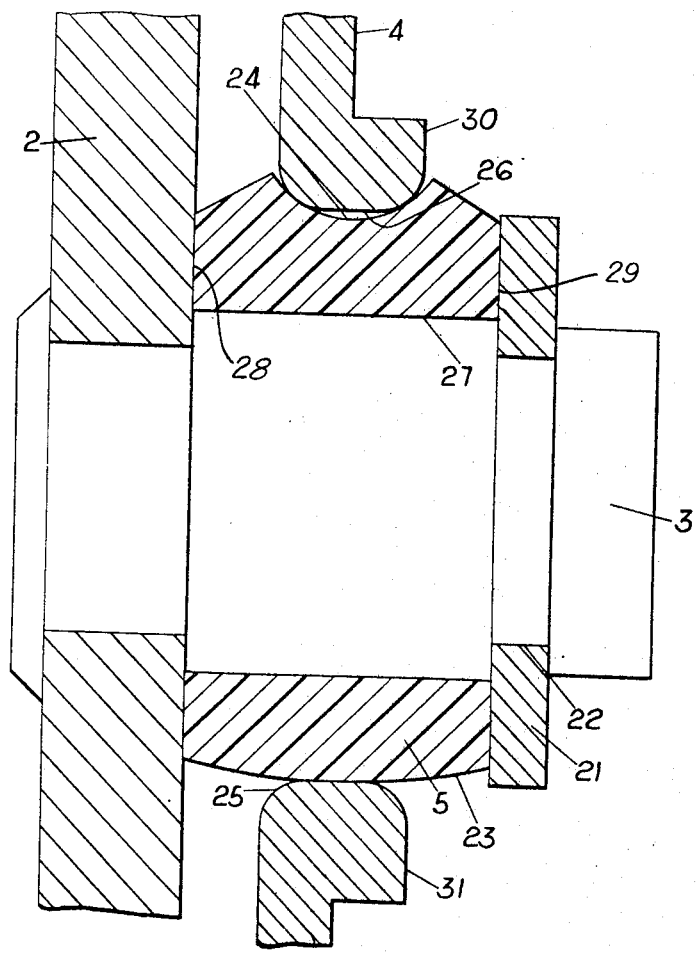
FIGURE 7 is a section to an enlarged scale on the line VII—VII of FIGURE 1.

In the windscreen wiper system shown in FIGURE 1 an electric motor 1 drives a double rotary crank 2 having a first crankpin 3, to which one end of a link 4 is pivotally connected by a bearing bush 5, and a second crankpin 6 which is pivotally connected by a bearing bush 7 to one end of a further link 8.

The opposite ends of the links 4 and 8 are respectively pivotally connected to crankpins 9, 10 at the ends of oscillatory cranks 12 and 13 by means of bearing bushes 14, 15 respectively. The bearing bushes 5, 7, 14 and 15 are all of similar construction.

The oscillatory cranks 12 and 13 carry at their other ends pivot pins 16, 17 respectively which are adapted to be journalled in bearings on a motor vehicle body (not shown) and to carry windscreen wiper arm and blade assemblies 18, 19 respectively.

The connections between the opposite ends of the links 4, 8 with their respective crankpins are similar and the following description of the link 4 and its connection with the crank 5 is described in more detail hereunder as illustrative of the construction of all the link and crankpin connections.

As shown in FIGURES 2 to 7, each end of the link 4 has therein a rectangular opening 20, which, as shown in FIGURES 1 and 7, has therein a bearing bush 5 in which is journalled the crankpin 3 secured on the end of the drive crank 2. The bush 5 is secured against axial movement on the crankpin 3 by means of a circlip 21 which fits in an annular groove 22 adjacent the free end of the crankpin 3.

As shown in FIGURES 5, 6 and 7 the bearing bush 5 is formed as a rectangular prism two opposite faces 23, 24 of which are respectively of convex and concave curvature and form parts of the surfaces of the larger and the smaller of two concentric cylinders of different radii, said opposite faces 23, 24 being respectively engaged by opposite longitudinally spaced edges 25, 26 of the rectangular opening 20 in the end of the link 4 into which the bush fits. The crankpin 3 fits in a bore 27 which extends through a second pair of opposite faces 28, 29 of the bush 5 in a direction at right angles to the common axis of the aforesaid opposite faces 23, 24.

As shown in FIGURE 7 the opposite plane or end faces 28, 29 of the bush 5 abut the crank arm 2 and the circlip 21 respectively.

The longitudinally spaced edges 25, 26 of the rectangular recess 20 in the link 4 are preferably formed of rounded contour to facilitate relative movement between the curved surface of the bush 5 and the edges of the opening 20, this being conveniently effected by folding back on to itself a narrow portion of the metal of the link 4 immediately adjacent the edge of the opening 20, as shown at 30 and 31, so as to form a beaded edge the radius of curvature of which is slightly more than the thickness of the metal of the link and substantially the same as that of the smaller cylindrical surface 24 of the bush 5.

The mechanism is assembled by fitting the concave recess 24 on the bearing bush 5 to the beaded edge of the rectangular opening 20 in the link formed by the bent-over portion 30 and on the pivot thus produced rotating the bush 5 until the convex surface thereon engages the other beaded edge 25 of the opening 20 formed by the folded over portion 31 at the edge of the opening: the circlip 21 is then fitted to retain the bush 5 on the crankpin 3.

When each end of the link 4 which interconnects the crankpins 3 and 9 on the rotary drive crank 2 and the reciprocatory crank 12 respectively of the windscreen wiper drive mechanism are fitted with a bearing bush as described above the two cranks 2 and 12 are interconnected in a manner which permits the axes of the crankpins 3, 9 to be out of parallel alignment, the cylindrical surfaces 23, 24 on the bush 5 permitting the link 4 to pivot on one edge of the rectangular opening 20 therein relative to the bearing bush 5.

The bearing bushes may be made of plastics materials such as polyamide resin, polyacetyl resin, polypropylene or polyurethane; or of metal such as sintered bronze, sintered stainless steel or of carbon.

If the bearing bush is made of a resilient material, such as a resilient plastics material, flexible prongs 32 may be moulded integral therewith (as shown in dotted lines in FIGURES 5 and 6) so as to extend across one end of the opening 27 in the bush and engage with the groove 22 in the end of the crankpin 3 to prevent relative axial movement between the bush and crankpin. Such an arrangement avoids the need for a separate retainer such as the circlip 21 to retain the bearing bush on the crankpin. Also, if the bearing bush is made from resilient plastics material it may have ears 33, 34 moulded integral therewith on opposite plane faces of the bush (as shown in dotted lines in FIGURE 6), to prevent the bush 5 falling out of the opening 20 in the link 4 during assembly of the link 4, bearing bush 5, crankpin 3 and crank 2.

As shown in FIGURE 8, the opposite edges of the opening 20 in the end of the link 4, instead of being folded over to present a smooth rounded surface for engagement with the bush 5, may have spring clips 40, 41 of substantially U-shaped in section fitted thereover to provide such smooth rounded surfaces. The two clips 40, 41 may, for convenience in manufacture and assembly be made as a single part with an integral connector strip (not shown) connecting the two clip portions.

Although suitable in particular for windscreen wiper drive mechanisms, the invention is also applicable to other drive mechanisms in which a drive crank and a driven crank are interconnected by a link and it is necessary to allow for relative movement between the link and the crank pins of the cranks to which the link is connected, owing to the cranks not rotating in strictly parallel planes.

I claim:

1. A windscreen wiper drive mechanism in which each end of a link which interconnects a rotary and an oscillatory crank is pivotally connected to a crankpin of its associated crank by a bearing bush formed as a rectangular prism two opposite faces of which are respectively of convex and concave curvature and form part of the surfaces of the larger and smaller of two concentric cylinders of different radii, said opposite faces being respectively engaged by opposite longitudinally spaced edges of a rectangular opening in the end of the link into which the bush fits, and the crankpin fitting in a bore which extends through a second pair of opposite faces of said bush in a direction at right angles to the common axis of the first said opposite faces.

2. A crank drive mechanism in which each end of a link which interconnects a rotary and an oscillatory crank is pivotally connected to a crankpin of its associated crank by a bearing bush formed as a rectangular prism two opposite faces of which are respectively of convex and concave curvature and form part of the surfaces of the larger and smaller of two concentric cylinders of different radii, said opposite faces being respectively engaged by opposite longitudinally spaced edges of a rectangular opening in the end of the link into which the bush fits, and the crankpin fitting in a bore which extends through a second pair of opposite faces of said bush in a direction at right angles to the common axis of the first said opposite faces.

3. Mechanism according to claim 1, in which the face of the prism adjacent one end of the bore abuts the crank-arm, a retainer engaging a recess in the other end of the crankpin to prevent relative axial movement between the bush and crankpin.

4. Mechanism according to claim 1, in which said longitudinally spaced edges of the rectangular recess in the link are of rounded contour to facilitate relative movement between the curved surfaces of the bush and the edges of the recess.

5. Mechanism according to claim 4, in which said longitudinally spaced edges are formed by folding back onto itself a narrow portion of the metal of the link immediately adjacent the edge of the recess so as to form a beaded edge the radius of curvature of which is slightly more than the thickness of the metal of the link and substantially the same as that of the smaller radius cylindrical surface of the bush.

6. Mechanism according to claim 1, in which said longitudinally spaced edges of the opening are formed by the surfaces of spring clips which are fitted over the corresponding edges of a rectangular aperture in the end of the link.

7. Mechanism according to claim 1, in which said bush is made of plastic material.

8. Mechanism according to claim 1, in which said bearing bush is made of a resilient material and flexible prongs are moulded integral therewith so as to project over one end of the opening in the bush and engage with a groove in an end of the crankpin to prevent relative axial movement between the bush and crankpin.

9. Mechanism according to claim 1, in which said bearing bush is made of resilient material and has ears moulded integral therewith to prevent the bush from falling out of the opening in the link during the assembly of the link, bearing bush, crankpin and crank.

References Cited

UNITED STATES PATENTS

| | | | |
|---|---|---|---|
| 1,436,074 | 11/1922 | Anderson | 74—579 |
| 1,735,491 | 11/1929 | Blunt | 74—579 |
| 2,170,264 | 8/1939 | Horton | 74—579 |
| 2,810,294 | 10/1957 | Latta et al. | 15—250.17 |
| 2,892,352 | 6/1959 | Saalfrank | 74—44 |
| 3,216,753 | 11/1965 | Oishei | 308—72 |
| 3,252,742 | 5/1966 | Swanstorm | 308—72 |
| 3,298,754 | 1/1967 | Riester | 308—72 |
| 3,401,964 | 9/1968 | Johnson | 308—72 |

FOREIGN PATENTS 277,573   9/1927   Great Britain.

FRED C. MATTERN, JR., *Primary Examiner.*

W. S. RATLIFF, JR., *Assistant Examiner.*

U.S. Cl. X.R.

74—579; 308—72